(12) United States Patent
Ando

(10) Patent No.: US 11,820,243 B2
(45) Date of Patent: Nov. 21, 2023

(54) CHARGER AND VEHICLE

(71) Applicant: TOYOTA JIDOSHA KABUSHIKI KAISHA, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 17/476,751

(22) Filed: Sep. 16, 2021

(65) Prior Publication Data

US 2022/0089049 A1 Mar. 24, 2022

(30) Foreign Application Priority Data

Sep. 18, 2020 (JP) .................................. 2020-157378

(51) Int. Cl.
| | | |
|---|---|---|
| *H02J 7/00* | (2006.01) | |
| *B60L 53/20* | (2019.01) | |
| *H02M 3/335* | (2006.01) | |
| *B60L 1/00* | (2006.01) | |
| *H02J 7/02* | (2016.01) | |

(52) U.S. Cl.
CPC ............... *B60L 53/20* (2019.02); *B60L 1/006* (2013.01); *H02J 7/0042* (2013.01); *H02J 7/00712* (2020.01); *H02J 7/02* (2013.01); *H02M 3/33573* (2021.05); *H02M 3/33584* (2013.01); *H02J 2207/20* (2020.01); *H02J 2207/50* (2020.01)

(58) Field of Classification Search
CPC ........................................................ H02J 7/02
See application file for complete search history.

(56) References Cited

U.S. PATENT DOCUMENTS

2017/0288569 A1* 10/2017 Uda ...................... H02M 7/537

FOREIGN PATENT DOCUMENTS

| | | |
|---|---|---|
| EP | 2538518 A1 | 12/2012 |
| EP | 2760096 A1 | 7/2014 |
| EP | 3439137 A1 | 2/2019 |
| JP | 2013-123313 A | 6/2013 |
| JP | 2013-240191 A | 11/2013 |
| JP | 2015-050894 A | 3/2015 |
| JP | 5989589 B2 | 9/2016 |
| WO | 2014/174808 A1 | 10/2014 |

\* cited by examiner

*Primary Examiner* — Robert Grant
(74) *Attorney, Agent, or Firm* — Dinsmore & Shohl LLP

(57) ABSTRACT

A charger includes a DC port, a first AC port, a second AC port, a bidirectional converter, and a switching device. The switching device includes at least one switching relay that selectively switches between a first power path and a second power path, the first power path connecting the bidirectional converter and the first AC port, the second power path connecting the bidirectional converter and the second AC port. The charger further includes a limiting resistance connected in parallel to a position that bypasses a switching relay on the first power path.

20 Claims, 12 Drawing Sheets

《COMPARATIVE EXAMPLE 1》

CHARGER AND VEHICLE

CROSS REFERENCE TO RELATED APPLICATIONS

This nonprovisional application claims priority to Japanese Patent Application No. 2020-157378 filed on Sep. 18, 2020 with the Japan Patent Office, the entire contents of which are hereby incorporated by reference.

BACKGROUND

Field

The present disclosure relates to a charger and a vehicle.

Description of the Background Art

For example, a vehicle described in Japanese Patent Laying-Open No. 2013-240191 has mounted thereon a charger that outputs electric power input from an inlet to a power storage device and outputs electric power input from the power storage device to an electric outlet. A power line connected to the charger branches off into a power line extending to the inlet and a power line extending to the electric outlet. A CO (Change-Over) contact relay that connects either the inlet or the electric outlet to the charger is arranged at the branch point. Two relays (a charging relay and a system main relay) are further provided between the charger and the power storage device.

SUMMARY

In the vehicle described in Japanese Patent Laying-Open No. 2013-240191, many relays are provided around the charger. When a charging circuit including an electric resistance that suppresses an inrush current at the time of precharging is used, a precharge relay connected in parallel to the above-described electric resistance is further provided, in addition to the above-described relays. In such a charging circuit, the precharge relay enters an open state when precharging is performed, and thus, the above-described electric resistance suppresses the inrush current.

As described above, in a charger that can perform both charging and power feeding and performs precharging at the start of charging, the number of relays provided around the charger tends to increase. When the number of relays provided around the charger increases and circuits around the charger become complicated, the burden of the wiring work is likely to increase and the frequency of occurrence of an abnormality is likely to increase. When a precharge relay is provided inside the charger, it is concerned that the number of relays provided inside the charger increases. An increase in the number of components provided inside the charger and an increase in the number of components provided around the charger both lead to an increase in cost.

The present disclosure has been made to solve the above-described problem, and an object of the present disclosure is to reduce the number of relays provided around a charger while simplifying a circuit inside the charger, and suitably perform charging and power feeding by the charger.

A charger according to a first aspect of the present disclosure includes: a bidirectional converter; a DC port that electrically connects the charger to a power storage device; a first AC port that receives first AC power for charging the power storage device; and a second AC port that outputs second AC power. The bidirectional converter converts the first AC power into DC power and outputs the DC power to the DC port, and converts DC power supplied from the power storage device to the DC port into the second AC power and outputs the second AC power to the second AC port. The charger further includes: a switching device including at least one switching relay that selectively switches between a first power path and a second power path, the first power path connecting the bidirectional converter and the first AC port, the second power path connecting the bidirectional converter and the second AC port; and an electric resistance connected in parallel to a position that bypasses a switching relay on the first power path, of the at least one switching relay. Hereinafter, the electric resistance connected in parallel to the position that bypasses the switching relay on the first power path will also be referred to as "limiting resistance".

In the above-described charger, the bidirectional converter converts the AC power (first AC power) input to the first AC port into the DC power. The power storage device can be charged with the thus-obtained DC power. The bidirectional converter also converts the DC power supplied from the power storage device to the DC port into the AC power (second AC power). The thus-obtained AC power is output from the second AC port, and thus, power feeding by the charger can be suitably performed.

In the above-described charger, the switching device can bring one of the first power path and the second power path into a connected state and bring the other into a disconnected state. Thus, switching of the power path by the charger can be suitably performed. In addition, since the switching device is provided inside the charger, the number of relays provided around the charger (i.e., outside the charger) can be reduced. Furthermore, in the above-described charger, the electric resistance (limiting resistance) is connected in parallel to the position that bypasses the switching relay on the first power path, of the at least one switching relay of the switching device. Since the switching relay also functions as a precharge relay, the number of relays provided inside the charger can also be reduced.

As described above, according to the above-described configuration, it is possible to reduce the number of relays provided around the charger while simplifying a circuit inside the charger, and suitably perform charging and power feeding by the charger.

The limiting resistance may be arranged between the first AC port and the bidirectional converter. The limiting resistance may be connected in series to a fuse. The switching relay may be implemented by an electromagnetic mechanical relay. The switching relay may be implemented by an electromagnetic contactor that is generally referred to as "contactor".

The bidirectional converter may be connected to each of a first power line and a second power line. The first power line may be connected to the DC port. The second power line may branch off into the first power path and the second power path at a branch point.

In the above-described configuration, the power line branches off inside the charger, and thus, circuits around the charger (i.e., circuits outside the charger) are simplified.

The switching relay on the first power path may be a CO (Change-Over) contact relay arranged at the branch point to bring one of the first power path and the second power path into a connected state and bring the other into a disconnected state.

In the above-described configuration, the CO contact relay can bring one of the first power path and the second power path into the connected state and bring the other into the disconnected state. According to the above-described configuration, the number of relays can be reduced, as compared with a configuration in which relays are separately provided on the first power path and the second power path.

The CO contact relay may be a first CO contact relay provided on a power path having a first polarity, and a second CO contact relay paired with the first CO contact relay may be provided on a power path having a second polarity opposite to the first polarity.

The switching relay on the first power path may be a first switching relay arranged between the first AC port and the branch point to switch between connection and disconnection of the first power path. The at least one switching relay in the switching device may further include a second switching relay arranged between the second AC port and the branch point to switch between connection and disconnection of the second power path.

In the above-described configuration, the first switching relay and the second switching relay are provided on the first power path and the second power path, respectively. According to the above-described configuration, both of the first power path and the second power path can be brought into the connected state or the disconnected state as needed.

The first switching relay may be provided on the first power path having the first polarity, and a third switching relay paired with the first switching relay may be provided on the first power path having the second polarity opposite to the first polarity. The second switching relay may be provided on the second power path having the first polarity, and a fourth switching relay paired with the second switching relay may be provided on the second power path having the second polarity opposite to the first polarity.

The DC port may be a connector that connects, to the charger, a power line extending to the power storage device. The first AC port may be a connector that connects, to the charger, a power line extending to an inlet to which a charging plug is connectable. The second AC port may be a connector that connects, to the charger, a power line extending to an electric outlet that outputs AC power.

The above-described charger can perform charging of the power storage device using the electric power input to the inlet, and power feeding to the electric outlet using the electric power supplied from the power storage device to the DC port. In addition, the charger is removable by each connector, which facilitates replacement of the charger.

The above-described charger may be connectable through the first AC port to a plurality of types of inlets having different specifications. The above-described electric outlet may output the second AC power output from the second AC port as it is, or may include a built-in power conversion circuit that performs predetermined power conversion (e.g., voltage transformation) of the second AC power.

The charger may include a capacitor precharged by the first AC power at the start of charging of the power storage device. The capacitor may be included in the bidirectional converter.

A vehicle according to a second aspect of the present disclosure includes: any charger described above; and a controller that controls the charger. The controller controls the switching device such that when charging of the power storage device using the first AC power is started, the switching relay on the first power path brings the first power path into a disconnected state and thus the limiting resistance suppresses an inrush current at the time of precharging, and when the precharging is completed, the switching relay on the first power path brings the first power path into a connected state.

In the above-described vehicle, the controller controls the charger, and thus, charging and power feeding by the charger can be performed. In addition, the above-described control makes it possible to suppress the inrush current at the start of charging (at the time of precharging).

The vehicle may further include: the power storage device electrically connected to the DC port of the charger; an inlet electrically connected to the first AC port of the charger; and a vehicle interior electric outlet electrically connected to the second AC port of the charger.

The above-described vehicle can perform external charging of the power storage device using the electric power input to the inlet. The external charging refers to charging of the power storage device using the electric power supplied from outside the vehicle. The above-described vehicle can also perform power feeding to the vehicle interior electric outlet using the electric power of the power storage device. Hereinafter, the power feeding to the vehicle interior electric outlet will also be referred to as "electric outlet power feeding". As a result of the electric outlet power feeding, the vehicle interior electric outlet becomes available, which improves the convenience of an occupant. The electric power output to the vehicle interior electric outlet may be AC power having a voltage of 100 V or higher, or may be AC power having a voltage lower than 100 V.

The vehicle may be configured such that a component that operates in accordance with a control signal from the controller is not provided between the first AC port and the inlet and between the second AC port and the vehicle interior electric outlet.

According to the above-described configuration, the number of signal lines around the charger can be reduced.

At least during traveling of the vehicle, the controller may bring the first power path into the disconnected state and bring the second power path into the connected state.

According to the above-described configuration, an occupant can use the vehicle interior electric outlet during traveling of the vehicle.

The first AC port may output third AC power. The bidirectional converter may convert the DC power supplied from the power storage device to the DC port into the third AC power and output the third AC power to the first AC port. The controller may control the switching device such that when external power feeding for outputting the third AC power from the first AC port to the inlet is started, the switching relay connected in parallel to the limiting resistance brings the first power path into the disconnected state and thus the limiting resistance suppresses an inrush current, and then, the switching relay connected in parallel to the limiting resistance brings the first power path into the connected state.

In the above-described vehicle, the charger can convert the electric power of the power storage device into the third AC power and output the third AC power from the first AC port to the inlet. That is, the above-described vehicle can perform external power feeding. The external power feeding refers to supply of the electric power from the inlet of the vehicle to outside the vehicle. In addition, the above-described control makes it possible to suppress the inrush current at the start of external power feeding.

The above-described vehicle may be an electrically-powered vehicle. The electrically-powered vehicle refers to a vehicle that travels using electric power stored in a power storage device. Examples of the electrically-powered vehicle include an electric vehicle (EV) and a plug-in hybrid vehicle (PHV).

The foregoing and other objects, features, aspects and advantages of the present disclosure will become more apparent from the following detailed description of the present disclosure when taken in conjunction with the accompanying drawings.

DETAILED DESCRIPTION

Figure 1:
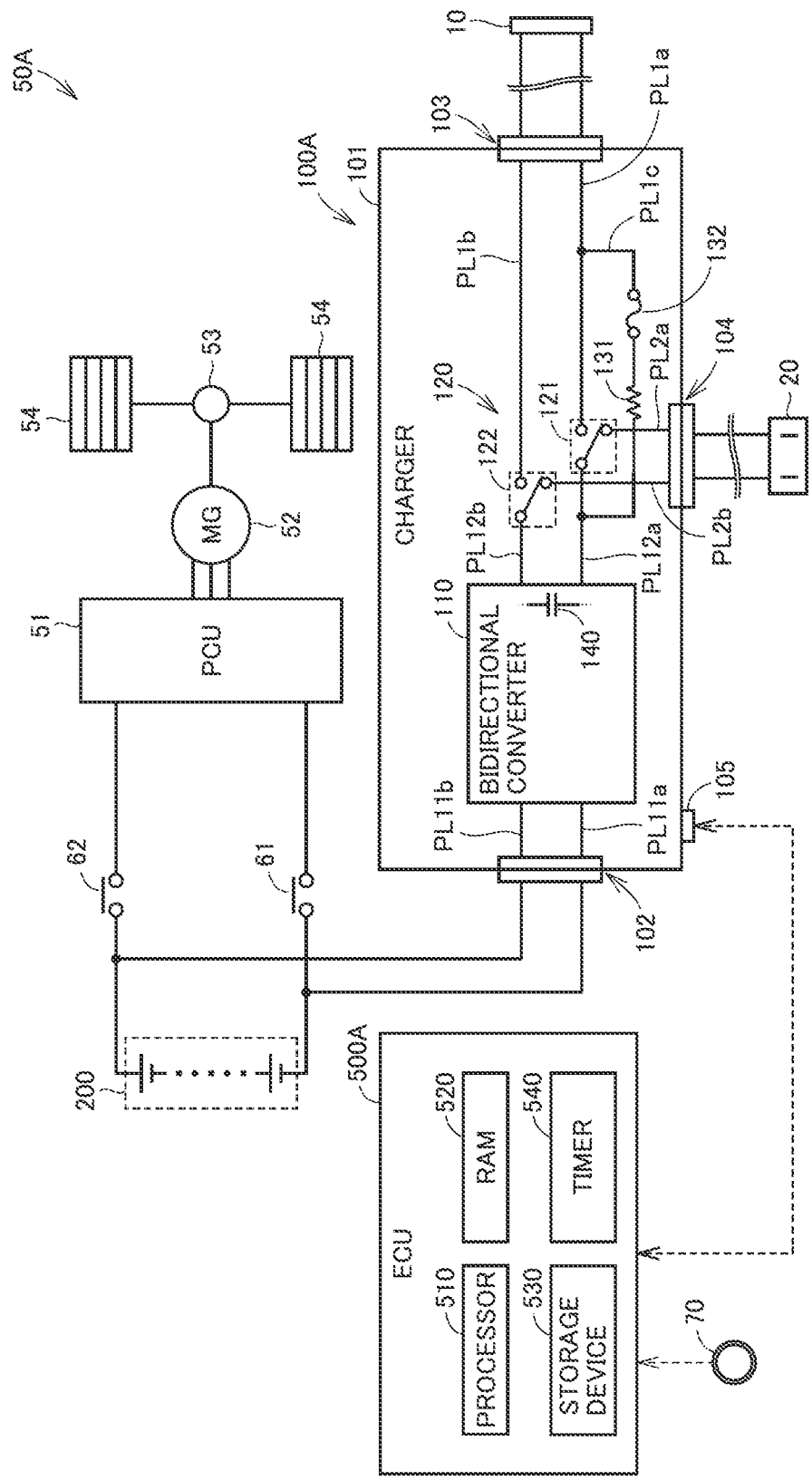
FIG. 1 shows a configuration of a vehicle according to a first embodiment of the present disclosure.

Embodiments of the present disclosure will be described in detail with reference to the drawings, in which the same or corresponding portions are denoted by the same reference characters and description thereof will not be repeated. Hereinafter, an electronic control unit will also be referred to as "ECU".

First Embodiment

FIG. 1 shows a configuration of a vehicle 50A according to a first embodiment. Referring to FIG. 1, vehicle 50A includes an inlet 10, an electric outlet 20, a charger 100A, a battery 200, and an ECU 500A. Charger 100A includes a housing 101. Housing 101 includes a DC port 102 that electrically connects charger 100A to battery 200, a first AC port 103, a second AC port 104 that outputs AC power, and a communication port 105 to which a communication line is connectable. ECU 500A controls charger 100A. ECU 500A according to the first embodiment corresponds to an example of "controller" according to the present disclosure.

When vehicle 50A performs external charging, AC power for charging battery 200 is input to first AC port 103. When vehicle 50A performs electric outlet power feeding, second AC port 104 outputs AC power. When vehicle 50A performs external power feeding, first AC port 103 outputs AC power. The AC power input to first AC port 103 at the time of external charging corresponds to an example of "first AC power" according to the present disclosure. The AC power output from second AC port 104 at the time of electric outlet power feeding corresponds to an example of "second AC power" according to the present disclosure. The AC power output from first AC port 103 at the time of external power feeding corresponds to an example of "third AC power" according to the present disclosure.

DC port 102 is a connector that connects, to charger 100A, a power line extending to battery 200. First AC port 103 is a connector that connects, to charger 100A, a power line extending to inlet 10 to which a charging plug is connectable. Second AC port 104 is a connector that connects, to charger 100A, a power line extending to electric outlet 20 that outputs AC power. Charger 100A is removable by each connector, which facilitates replacement of charger 100A.

Figure 2:
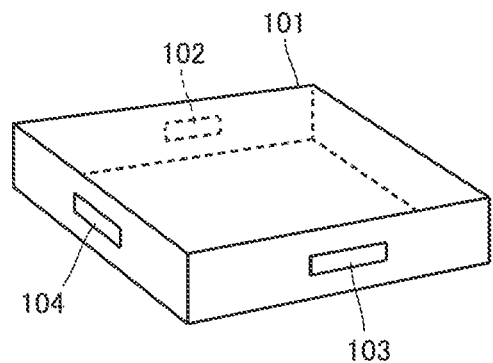
FIG. 2 is a perspective view showing an example shape of a housing of a charger shown in FIG. 1.

FIG. 2 is a perspective view showing an example shape of housing 101. Referring to FIG. 2, housing 101 has a shape of, for example, a flat box. Each of DC port 102, first AC port 103 and second AC port 104 is provided in, for example, a side surface of housing 101. The shape of housing 101 and the arrangement of each port are not limited to the example shown in FIG. 2, and can be changed as appropriate.

Referring again to FIG. 1, charger 100A includes, in housing 101, a bidirectional converter 110, a switching device 120, a limiting resistance 131, and a fuse 132. Bidirectional converter 110 converts the first AC power input to first AC port 103 at the time of external charging into DC power and outputs the DC power to DC port 102. At the time of electric outlet power feeding, bidirectional converter 110 converts DC power supplied from battery 200 to DC port 102 into the second AC power and outputs the second AC power to second AC port 104. At the time of external power feeding, bidirectional converter 110 converts the DC power supplied from battery 200 to DC port 102 into the third AC power and outputs the third AC power to first AC port 103. Although the details will be described below, bidirectional converter 110 includes a capacitor 140 (see FIG. 3). Capacitor 140 is precharged by the first AC power at the start of external charging. Capacitor 140 is also precharged at the start of external power feeding. Limiting resistance 131 is an electric resistance that suppresses an inrush current at the time of precharging. Fuse 132 blows when an overcurrent flows.

Figure 3:
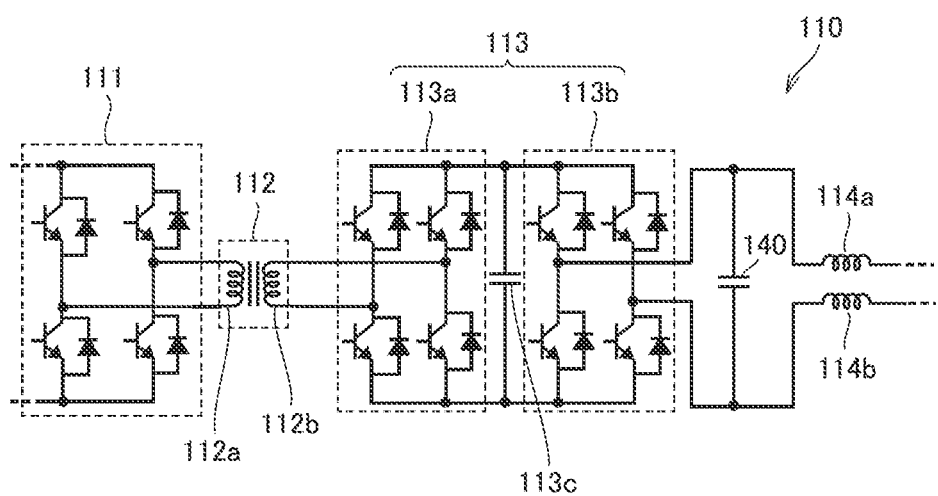
FIG. 3 shows an example circuit configuration of a bidirectional converter shown in FIG. 1.

FIG. 3 shows an example circuit configuration of bidirectional converter 110. Referring to FIG. 3, bidirectional converter 110 includes an inverter 111, an insulating circuit 112, an inverter 113, two reactors 114a and 114b, and capacitor 140. Inverter 111 is a full bridge circuit including four switching elements. Insulating circuit 112 is an insulating transformer including a first coil 112a and a second coil 112b. Insulating circuit 112 performs voltage transformation at a ratio corresponding to a winding ratio between first coil 112a and second coil 112b. Inverter 113 includes a first inverter 113a, a second inverter 113b and a smoothing capacitor 113c. Each of first inverter 113a and second inverter 113b is a full bridge circuit including four switching elements. Each switching element included in inverters 111 and 113 is controlled by ECU 500A.

At the time of each of power feeding and charging, ECU 500A controls bidirectional converter 110 such that bidirectional converter 110 performs power conversion described below. Although not shown in FIG. 3, various types of sensors (e.g., a current sensor and a voltage sensor) may be provided at appropriate locations of the circuit shown in FIG. 3 in order to obtain information used by ECU 500A for control.

At the time of power feeding, inverter 111 converts DC power input from a first end (on the DC port 102 side shown in FIG. 1) into high-frequency AC power and outputs the high-frequency AC power to insulating circuit 112. Insulating circuit 112 transmits the output (AC power) of inverter 111 to first inverter 113*a*, and first inverter 113*a* rectifies the AC power received from insulating circuit 112 and outputs the rectified power to second inverter 113*b*. Second inverter 113*b* converts the DC power received from first inverter 113*a* into predetermined AC power and outputs the AC power to a second end (on the reactor 114*a*, 114*b* side).

At the time of charging, second inverter 113*b* rectifies AC power input from the second end and outputs the rectified power to first inverter 113*a*, and first inverter 113*a* converts the DC power received from second inverter 113*b* into high-frequency AC power. Insulating circuit 112 transmits the output (AC power) of first inverter 113*a* to inverter 111, and inverter 111 rectifies the AC power received from insulating circuit 112 and outputs the rectified power to the first end.

Referring again to FIG. 1, switching device 120 includes CO (Change-Over) contact relays 121 and 122. CO contact relays 121 and 122 switch between connection and disconnection of power paths in a charging circuit. Hereinafter, a power path that connects bidirectional converter 110 and first AC port 103 not via limiting resistance 131 will be referred to as "first power path". A power line PL1*a* forms a part of the first power path having a first polarity, and a power line PL1*b* forms a part of the first power path having a second polarity. A power path connecting bidirectional converter 110 and second AC port 104 will be referred to as "second power path". A power line PL2*a* forms a part of the second power path having the first polarity, and a power line PL2*b* forms a part of the second power path having the second polarity. A power path connecting bidirectional converter 110 and first AC port 103 via limiting resistance 131 will be referred to as "third power path". A power line PL1*c* forms a part of the third power path having the first polarity, and power line PL1*b* forms a part of the third power path having the second polarity. Although the details will be described below, switching device 120 is configured such that each of CO contact relays 121 and 122 switches between connection and disconnection of each of the first power path, the second power path and the third power path.

Switching device 120 selectively switches between the first power path and the second power path. Specifically, each of CO contact relays 121 and 122 brings one of the first power path and the second power path into a connected state and brings the other into a disconnected state. Each of CO contact relays 121 and 122 is implemented by an electromagnetic mechanical relay. CO contact relays 121 and 122 according to the first embodiment correspond to examples of "first CO contact relay" and "second CO contact relay", respectively.

A power line PL11*a* having the first polarity and a power line PL11*b* having the second polarity are connected to the first end of bidirectional converter 110. A power line PL12*a* having the first polarity and a power line PL12*b* having the second polarity are connected to the second end of bidirectional converter 110. At the time of charging, the electric power is input to the second end and output from the first end. At the time of power feeding, the electric power is input to the first end and output from the second end. The first polarity and the second polarity are opposite to each other.

Each of power lines PL11*a* and PL11*b* is connected to DC port 102. Power line PL12*a* branches off into power line PL1*a* and power line PL2*a* at a first branch point. CO contact relay 121 is arranged at the first branch point. Power line PL12*b* branches off into power line PL1*b* and power line PL2*b* at a second branch point. CO contact relay 122 is arranged at the second branch point. Power line PL11*a* and power line PL12*a* according to the first embodiment correspond to examples of "first power line" and "second power line" according to the present disclosure, respectively.

Power line PL1*c* is connected to each of a position of CO contact relay 121 on the bidirectional converter 110 side and a position of CO contact relay 121 on the first AC port 103 side in power line PL1*a*. Limiting resistance 131 and fuse 132 connected in series are provided on power line PL1*c*. CO contact relay 121 is connected in parallel to limiting resistance 131. Limiting resistance 131 is connected in parallel to a position that bypasses CO contact relay 121 located on the first power path.

CO contact relays 121 and 122 form a pair to switch between connection and disconnection of each of the power paths having the first polarity and the power paths having the second polarity. CO contact relay 121 is arranged at the first branch point to bring one of the first AC port 103 side (power line PL1*a*) and the second AC port 104 side (power line PL2*a*) into the connected state and bring the other into the disconnected state. CO contact relay 122 is arranged at the second branch point to bring one of the first AC port 103 side (power line PL1*b*) and the second AC port 104 side (power line PL2*b*) into the connected state and bring the other into the disconnected state.

When CO contact relay 121 is connected to power line PL1*a* (first power path), the second power path is disconnected. When CO contact relay 121 is connected to power line PL2*a* (second power path), the first power path is disconnected. When CO contact relay 122 is connected to power line PL1*b* (first power path), the second power path is disconnected. When CO contact relay 122 is connected to power line PL2*b* (second power path), each of the first power path and the third power path is disconnected.

Inlet 10 is electrically connected to first AC port 103 of charger 100A through a power line. A connector is provided at a tip of the power line extending to inlet 10, and the connector of inlet 10 is connected to first AC port 103. Inlet 10 is placed such that a user can use inlet 10 from outside vehicle 50A. Inlet 10 may be provided in, for example, a rear side surface of a vehicle body. Inlet 10 is covered with a charging lid when not in use. When the user opens the charging lid, inlet 10 is exposed. When the user connects a plug of electric vehicle supply equipment (EVSE) to inlet 10, electric power can be supplied to vehicle 50A by using the EVSE. The plug of the EVSE is implemented by, for example, a connector of a charging cable, and when the plug is connected to inlet 10, the EVSE and vehicle 50A are electrically connected through the charging cable. During external power feeding, the user can supply electric power from inlet 10 of vehicle 50A to the EVSE. The EVSE may reversely flow the electric power supplied from vehicle 50A to a not-shown power network.

Electric outlet 20 is electrically connected to second AC port 104 of charger 100A through a power line. A connector is provided at a tip of the power line extending to electric outlet 20, and the connector of electric outlet 20 is connected to second AC port 104. Electric outlet 20 is implemented by a vehicle interior electric outlet placed in the interior of vehicle 50A. Electric outlet 20 outputs the second AC power. The second AC power is, for example, AC power having a voltage of 100 V.

Battery 200 is electrically connected to DC port 102 of charger 100A through a power line. Battery 200 stores electric power for causing vehicle 50A to travel. Battery 200 is implemented by, for example, a secondary battery such as a lithium ion battery or a nickel metal hydride battery. In the first embodiment, an assembled battery including a plurality of lithium ion batteries is used as the secondary battery. The assembled battery is formed by electrically connecting a plurality of cells to each other. Battery 200 according to the first embodiment corresponds to an example of "power storage device" according to the present disclosure.

ECU 500A is connected to communication port 105 of charger 100A through a signal line. In vehicle 50A, a component that operates in accordance with a control signal from ECU 500A is not provided between first AC port 103 and inlet 10 and between second AC port 104 and electric outlet 20. Therefore, the number of signal lines around charger 100A can be reduced.

ECU 500A includes a processor 510, a random access memory (RAM) 520, a storage device 530, and a timer 540. A central processing unit (CPU) can, for example, be used as processor 510. RAM 520 functions as a working memory that temporarily stores data to be processed by processor 510. Storage device 530 can preserve the stored information. Storage device 530 includes, for example, a read only memory (ROM) and a rewritable non-volatile memory. In addition to programs, information (e.g., maps, mathematical formulas and various parameters) used by the programs is stored in storage device 530. In the first embodiment, processor 510 performs the programs stored in storage device 530, thereby performing various controls in ECU 500A.

Timer 540 provides a notification about the arrival of the set time to processor 510. When the time set at timer 540 comes, a signal indicating that the set time has come is transmitted from timer 540 to processor 510. In addition, ECU 500A can obtain the current time by using a real time clock (RTC) circuit (not shown) built into ECU 500A.

ECU 500A may accept a reservation of each of timer charging and timer power feeding from the user. The timer charging and the timer power feeding refer to external charging and external power feeding performed in accordance with preset schedules, respectively. For example, by operating a predetermined input device (not shown), the user may be able to input the schedule (start time and end time) of each of timer charging and timer power feeding into ECU 500A, and make a reservation of each of timer charging and timer power feeding in ECU 500A. The input device may be mounted on vehicle 50A, or may be implemented by a mobile terminal (e.g., smartphone). ECU 500A may perform each of the reserved timer charging and the reserved timer power feeding.

Figure 4:
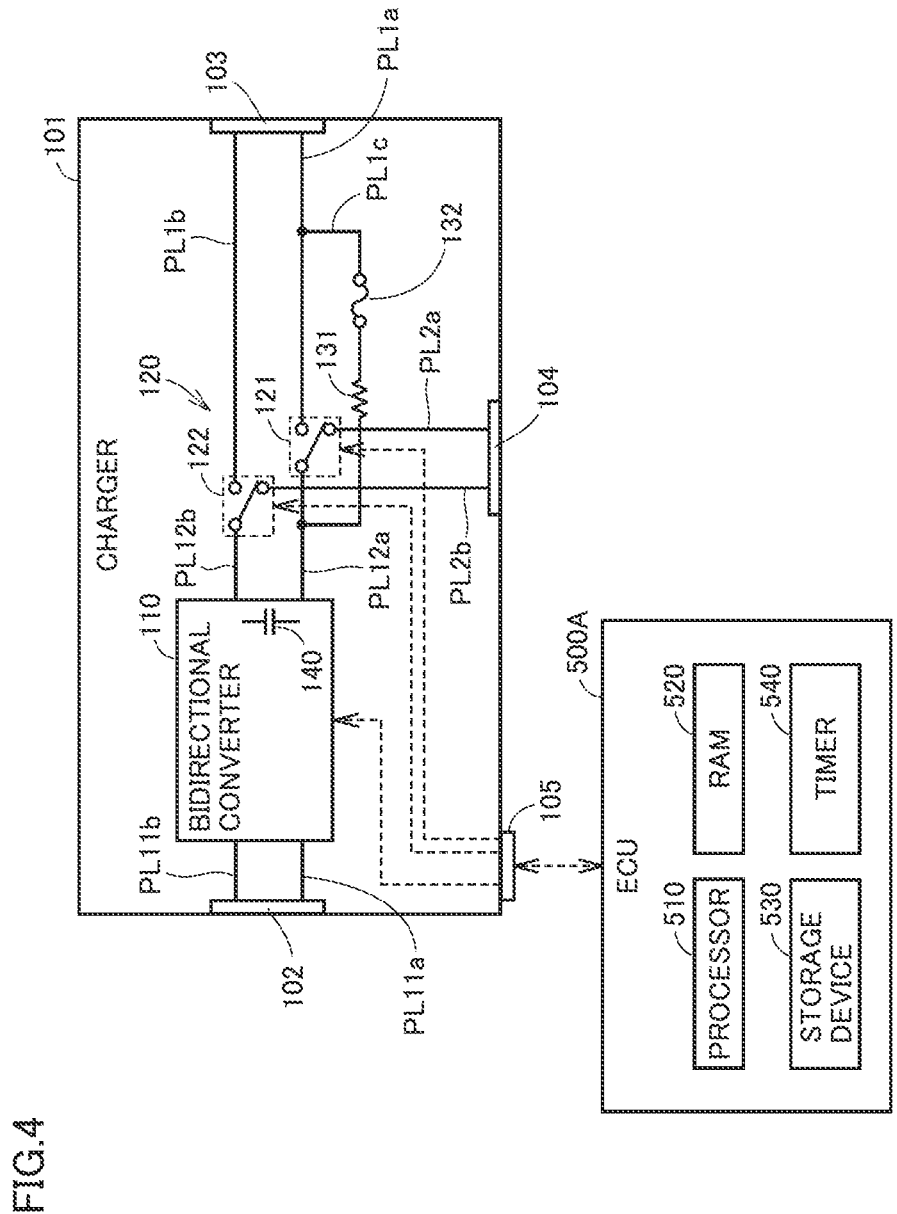
FIG. 4 shows an example manner of transmission of control signals in the housing of the charger shown in FIG. 1.

FIG. 4 shows an example manner of transmission of control signals in housing 101 of charger 100A. Referring to FIG. 4, ECU 500A is connected to each of bidirectional converter 110 and CO contact relays 121 and 122 in housing 101 through direct lines. Each direct line is a direct control line that directly connects devices on a one-to-one basis. ECU 500A can directly control each of bidirectional converter 110 and CO contact relays 121 and 122. By using the direct lines for transmission of the control signals, the control speed is increased.

Figure 5:
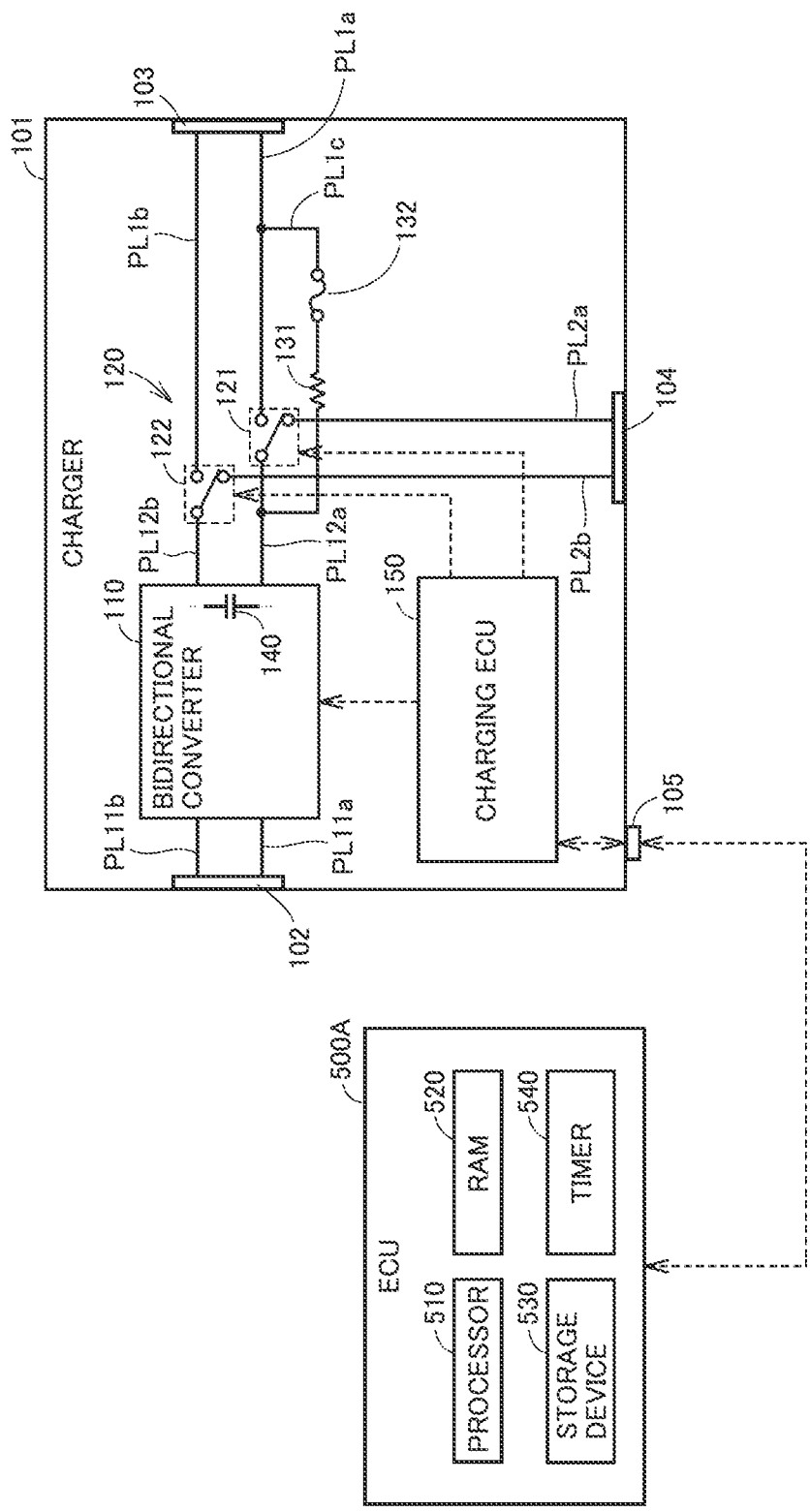
FIG. 5 shows a modification of the manner of transmission of the control signals shown in FIG. 4.

FIG. 5 shows a modification of the manner of transmission of the control signals shown in FIG. 4. Referring to FIG. 5, in the present modification, charger 100A includes a charging ECU 150 in housing 101. When ECU 500A is connected to communication port 105 through a signal line, ECU 500A and charging ECU 150 can communicate with each other. ECU 500A and charging ECU 150 may be connected to each other through a controller area network (CAN) bus. A central gateway (CGW) may be provided between ECU 500A and charging ECU 150. Charging ECU 150 controls each of bidirectional converter 110 and CO contact relays 121 and 122 in accordance with the control signal from ECU 500A. However, the present disclosure is not limited thereto, and ECU 500A may control bidirectional converter 110 through charging ECU 150 and ECU 500A may control CO contact relays 121 and 122 through the direct lines.

Referring again to FIG. 1, vehicle 50A further includes a power control unit (PCU) 51, a motor generator (MG) 52, a motive power transmission gear 53, a driving wheel 54, system main relays (SMRs) 61 and 62, and a startup switch 70. Vehicle 50A is an electrically-powered vehicle (e.g., electric vehicle) that travels using the electric power stored in battery 200.

Each of SMRs 61 and 62 is provided on a power path that connects battery 200 and PCU 51. Each of SMRs 61 and 62 is implemented by, for example, an electromagnetic mechanical relay. A state (connected state/disconnected state) of each of SMRs 61 and 62 is controlled by ECU 500A. When each of SMRs 61 and 62 is in a connected state, electric power can be exchanged between battery 200 and PCU 51. When each of SMRs 61 and 62 is in a disconnected state, electric power cannot be exchanged between battery 200 and PCU 51. Each of SMRs 61 and 62 is in the connected state during traveling of vehicle 50A.

MG 52 is implemented by, for example, a three-phase AC motor generator. MG 52 is driven by PCU 51 to rotate driving wheel 54 of vehicle 50A. PCU 51 includes, for example, an inverter and a converter (both are not shown). The inverter and the converter of PCU 51 are controlled by ECU 500A. The output torque of MG 52 is transmitted to driving wheel 54 through motive power transmission gear 53 that serves as a decelerator. MG 52 also performs regenerative power generation and supplies generated electric power to battery 200.

Startup switch 70 is a switch for starting up a vehicle system. Although the details will be described below, when startup switch 70 is operated in a stop state of the system, the vehicle system (including ECU 500A) starts up, and when startup switch 70 is operated during operation of the system, the vehicle system stops. Startup switch 70 is generally referred to as "power switch" or "ignition switch".

Charger 100A according to the first embodiment includes, in housing 101, bidirectional converter 110 (including capacitor 140), switching device 120 (CO contact relays 121 and 122), and limiting resistance 131. CO contact relay 121 is connected in parallel to limiting resistance 131. CO contact relay 121 functions as a precharge relay. DC port 102, first AC port 103 and second AC port 104 are provided in housing 101. Hereinafter, an effect produced by such charger 100A will be described, in comparison with a charger 300 according to a comparative example.

Figure 6:
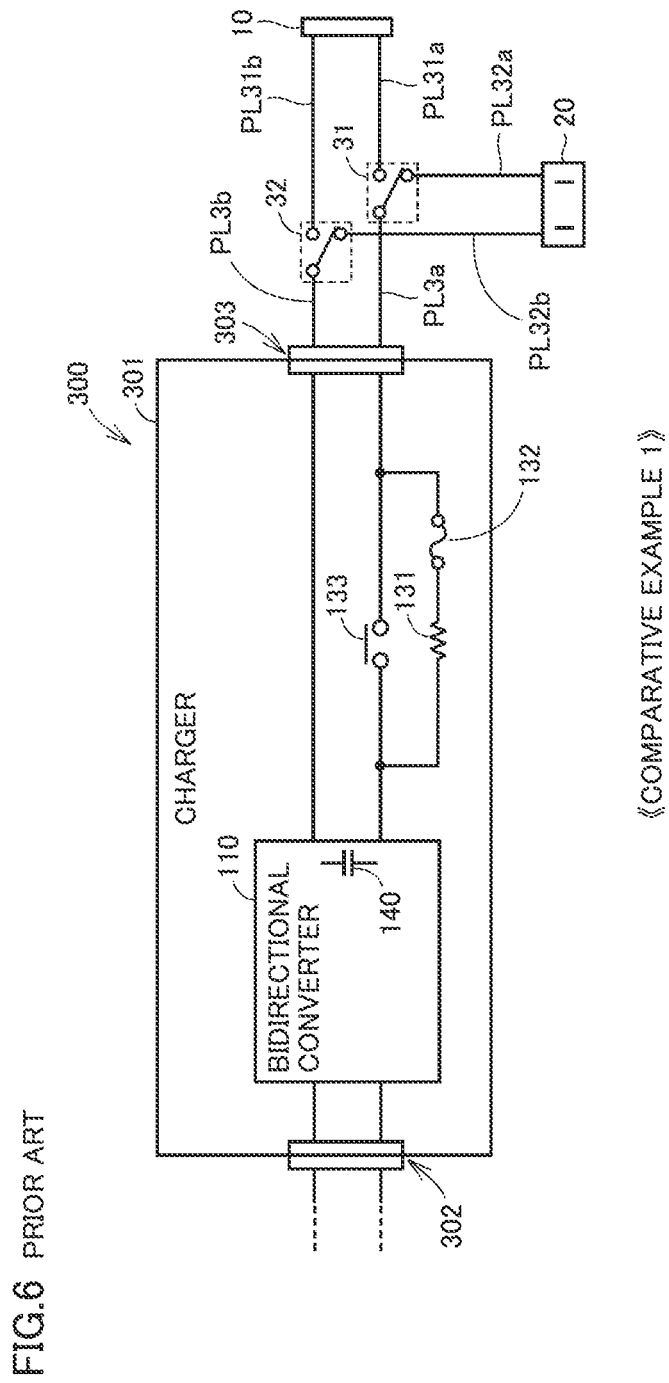
FIG. 6 shows a manner of use of a charger according to Comparative Example 1.

FIG. 6 shows a manner of use of charger 300 according to Comparative Example 1. Hereinafter, a configuration and a manner of use of charger 300 according to Comparative Example 1 will be described, with attention focused mainly on differences from the configuration and the manner of use of charger 100A shown in FIG. 1.

Referring to FIG. 6, charger 300 includes a housing 301 having a DC port 302 and an AC port 303. Charger 300 includes, in housing 301, bidirectional converter 110 (including capacitor 140), limiting resistance 131, fuse 132, and a precharge relay 133. Precharge relay 133 is connected in parallel to limiting resistance 131.

A power line PL3a having the first polarity and a power line PL3b having the second polarity are connected to AC port 303. Power line PL3a branches off into a power line PL31a and a power line PL32a at a third branch point. A CO contact relay 31 is arranged at the third branch point. Power line PL3b branches off into a power line PL31b and a power line PL32b at a fourth branch point. A CO contact relay 32 is arranged at the fourth branch point. Power line PL31a forms a part of the first power path having the first polarity, and power line PL31b forms a part of the first power path having the second polarity. Power line PL32a forms a part of the second power path having the first polarity, and power line PL32b forms a part of the second power path having the second polarity.

In Comparative Example 1, a switching device (CO contact relays 31 and 32) that switches between connection and disconnection of each of the first power path and the second power path is provided outside housing 301. In charger 300, the number of relays around charger 300 is likely to increase and circuits around charger 300 is likely to become complicated. When the circuits around charger 300 become complicated, the burden of the wiring work is likely to increase and the frequency of occurrence of an abnormality is likely to increase. In addition to the switching device (CO contact relays 31 and 32) provided outside housing 301, precharge relay 133 is provided inside housing 301.

In contrast, in charger 100A according to the first embodiment, as shown in FIG. 1, switching device 120 (CO contact relays 121 and 122) provided inside housing 101 can bring one of the first power path and the second power path into the connected state and bring the other into the disconnected state. Thus, the number of relays provided around charger 100A (i.e., outside charger 100A) can be reduced. Furthermore, in charger 100A, CO contact relay 121 is connected in parallel to limiting resistance 131. Since CO contact relay 121 also functions as a precharge relay, the number of relays provided inside charger 100A can also be reduced.

The operation of vehicle 50A (including charger 100A) according to the first embodiment will be described hereinafter with reference to FIGS. 7 to 9.

Figure 7:
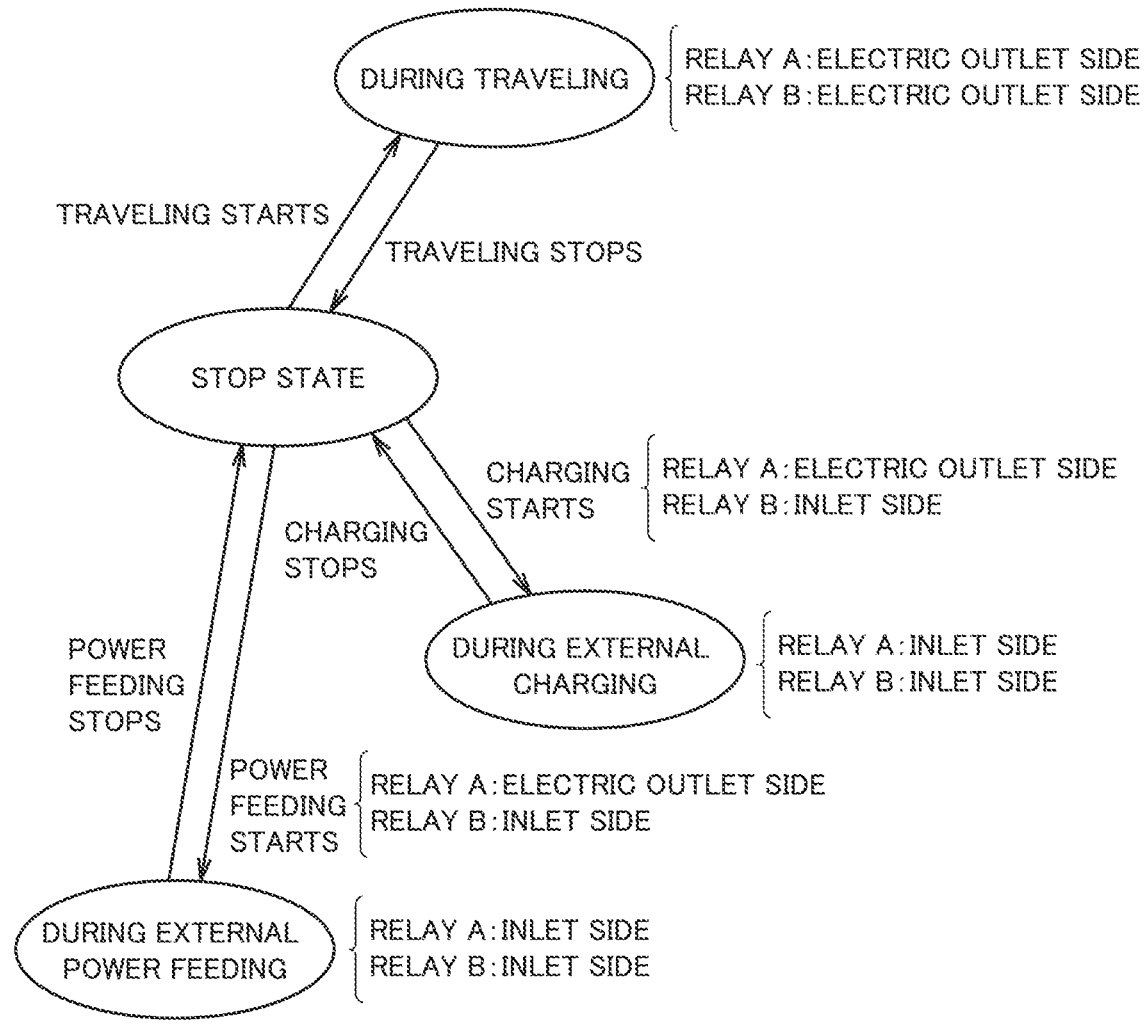
FIG. 7 is a diagram for illustrating transition of a state of the vehicle according to the first embodiment of the present disclosure.

FIG. 7 is a diagram for illustrating transition of a state of vehicle 50A. Referring to FIG. 7 together with FIG. 1, the state of vehicle 50A can be broadly categorized into "during traveling", "stop state", "during external charging", and "during external power feeding". In FIG. 7 and FIGS. 8 and 9 described below, "relay A" refers to CO contact relay 121, and "relay B" refers to CO contact relay 122.

"During traveling" described above refers to a state in which vehicle 50A can travel. For example, when the user performs a predetermined traveling start operation on startup switch 70 while vehicle 50A is in "stop state", the vehicle system starts up and SMRs 61 and 62 enter the connected state. When SMRs 61 and 62 enter the connected state, vehicle 50A enters "during traveling". However, when the plug of the EVSE is connected to inlet 10, the above-described traveling start operation is not enabled, and thus, the state transition from "stop state" to "during traveling" does not take place.

"Stop state" described above refers to a state in which the vehicle system is at a standstill (including a sleep state). When the user performs a predetermined traveling stop operation on startup switch 70, with vehicle 50A parked, while vehicle 50A is in "during traveling", the vehicle system enters the stop state (e.g., sleep state) and vehicle 50A enters "stop state". When vehicle 50A is in "stop state", the power paths are disconnected by bidirectional converter 110.

"During external charging" described above refers to a state in which vehicle 50A is performing external charging. For example, when a predetermined charging start condition is satisfied, with the plug of the EVSE connected to inlet 10, while vehicle 50A is in "stop state", the vehicle system starts up and external charging is started. When external charging is started, vehicle 50A enters "during external charging". Thereafter, when a predetermined charging end condition is satisfied, external charging ends, and the vehicle system enters the stop state and vehicle 50A enters "stop state".

The charging start condition may be satisfied when ECU 500A receives a charging start request from the EVSE. In a case where ECU 500A does not have a reservation of timer charging, the charging start condition may be satisfied when the plug of the EVSE is connected to inlet 10. In a case where ECU 500A has a reservation of timer charging, the charging start condition may be satisfied when the start time of timer charging comes, with the plug of the EVSE connected to inlet 10.

The charging end condition may be satisfied when ECU 500A receives a charging end request from the EVSE. Alternatively, the charging end condition may be satisfied when an SOC (State Of Charge) of battery 200 becomes equal to or higher than a predetermined SOC value. When the SOC of battery 200 is equal to or higher than the predetermined SOC value before the start of external charging, the charging start condition may not be satisfied.

"During external power feeding" described above refers to a state in which vehicle 50A is performing external power feeding. For example, when a predetermined power feeding start condition is satisfied, with the plug of the EVSE connected to inlet 10, while vehicle 50A is in "stop state", the vehicle system starts up and external power feeding is started. When external power feeding is started, vehicle 50A enters "during power feeding". Thereafter, when a predetermined power feeding end condition is satisfied, external power feeding ends, and the vehicle system enters the stop state and vehicle 50A enters "stop state".

The power feeding start condition may be satisfied when ECU 500A receives a power feeding start request from the EVSE. When ECU 500A has a reservation of timer power feeding, the power feeding start condition may be satisfied when the start time of timer power feeding comes, with the plug of the EVSE connected to inlet 10.

The power feeding end condition may be satisfied when ECU 500A receives a power feeding end request from the EVSE. Alternatively, the power feeding end condition may be satisfied when the SOC of battery 200 becomes equal to or lower than the predetermined SOC value. When the SOC of battery 200 is equal to or lower than the predetermined SOC value before the start of external power feeding, the power feeding start condition may not be satisfied.

When vehicle 50A is in "during traveling", ECU 500A connects both CO contact relays 121 and 122 to the electric outlet side. When CO contact relay 121 is connected to power line PL2a (electric outlet side), the first power path having the first polarity enters the disconnected state. In addition, when CO contact relay 122 is connected to power line PL2b (electric outlet side), the first power path having the second polarity enters the disconnected state. The second power path enters the connected state.

As described above, since the second power path is in the connected state during traveling of vehicle 50A, electric power can be supplied from battery 200 to electric outlet 20. When vehicle 50A is in "during traveling", ECU 500A controls bidirectional converter 110 such that the second AC power is output to electric outlet 20. Therefore, an occupant can use electric outlet 20 (vehicle interior electric outlet) during traveling of vehicle 50A.

When external charging (i.e., charging of battery 200 using the first AC power) is started, ECU 500A performs a process shown in FIG. 8 described below, thereby controlling CO contact relays 121 and 122 (switching relays).

Figure 8:
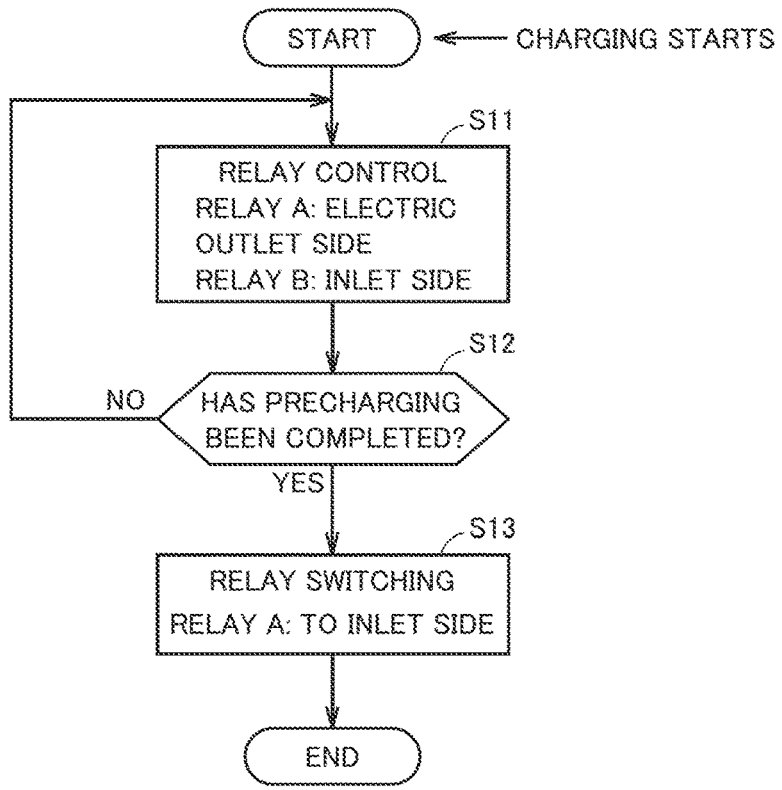
FIG. 8 is a flowchart showing relay control performed by a controller at the start of external charging in the first embodiment of the present disclosure.

FIG. 8 is a flowchart showing relay control performed by ECU 500A at the start of external charging. The process shown in this flowchart is performed when external charging is started.

Referring to FIG. 8 together with FIG. 1, in step (hereinafter, simply denoted as "S") 11, ECU 500A connects CO contact relays 121 and 122 to the electric outlet side and the inlet side, respectively. When CO contact relay 121 is connected to power line PL2a (electric outlet side), the first power path having the first polarity enters the disconnected state. In addition, when CO contact relay 122 is connected to power line PL1b (inlet side), the second power path having the second polarity enters the disconnected state. As a result, only the third power path, of the first to third power paths, enters the connected state. Thus, the inrush current is suppressed by limiting resistance 131 and precharging of capacitor 140 is performed.

In S12, ECU 500A determines whether or not the precharging has been completed. When a voltage of capacitor 140 reaches a predetermined reference value, ECU 500A may determine that the precharging has been completed.

When the precharging is in execution (NO in S12), S11 and S12 are repeated, and thus, CO contact relays 121 and 122 remain connected to the electric outlet side and the inlet side, respectively. Then, when the precharging has been completed (YES in S12), ECU 500A switches CO contact relay 121 to the inlet side in S13. As a result, CO contact relays 121 and 122 are both connected to the inlet side. When CO contact relay 121 is connected to power line PL1a (inlet side), the second power path having the first polarity enters the disconnected state. The first power path enters the connected state. When the processing in S13 is performed, a series of process shown in FIG. 8 ends. Thereafter, external charging is performed, with CO contact relays 121 and 122 both connected to the inlet side.

As described above, in vehicle 50A, ECU 500A controls switching device 120 such that when external charging is started, CO contact relay 121 connected in parallel to limiting resistance 131 brings the first power path into the disconnected state and thus limiting resistance 131 suppresses the inrush current at the time of precharging (S11), and when the precharging is completed (YES in S12), CO contact relay 121 brings the first power path into the connected state (S13). With such control, an inrush current at the start of external charging (during precharging) can be suppressed.

When external power feeding (i.e., power feeding for outputting the third AC power from first AC port 103 to inlet 10) is started, ECU 500A performs a process shown in FIG. 9 described below, thereby controlling CO contact relays 121 and 122 (switching relays).

Figure 9:
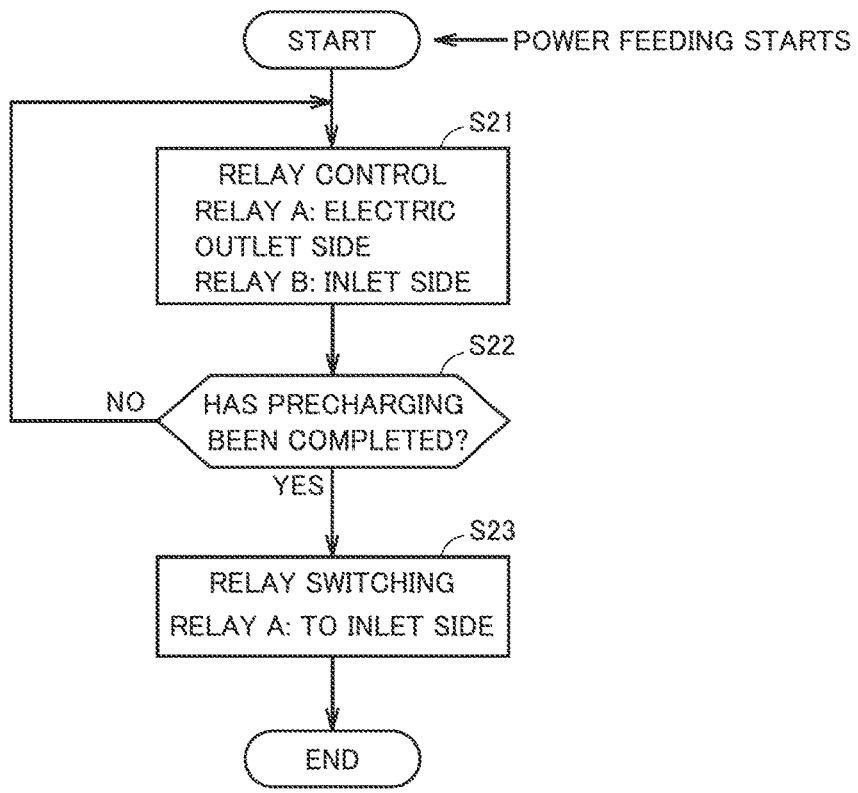
FIG. 9 is a flowchart showing relay control performed by the controller at the start of external power feeding in the first embodiment of the present disclosure.

FIG. 9 is a flowchart showing relay control performed by ECU 500A at the start of external power feeding. The process shown in this flowchart is performed when external power feeding is started.

Referring to FIG. 9 together with FIG. 1, the processing similar to that in S11 to S13 in FIG. 8 is performed in S21 to S23. After the processing in S23, external power feeding is performed, with CO contact relays 121 and 122 both connected to the inlet side.

As described above, in vehicle 50A, ECU 500A controls switching device 120 such that when external power feeding is started, CO contact relay 121 connected in parallel to limiting resistance 131 brings the first power path into the disconnected state and thus limiting resistance 131 suppresses the inrush current at the time of precharging (S21), and when the precharging is completed (YES in S22), CO contact relay 121 brings the first power path into the connected state (S23). With such control, the inrush current at the start of external power feeding (at the time of precharging) can be suppressed.

Second Embodiment

Hereinafter, a vehicle 50B according to a second embodiment will be described, with attention focused mainly on differences from vehicle 50A (including charger 100A) according to the first embodiment.

Figure 10:
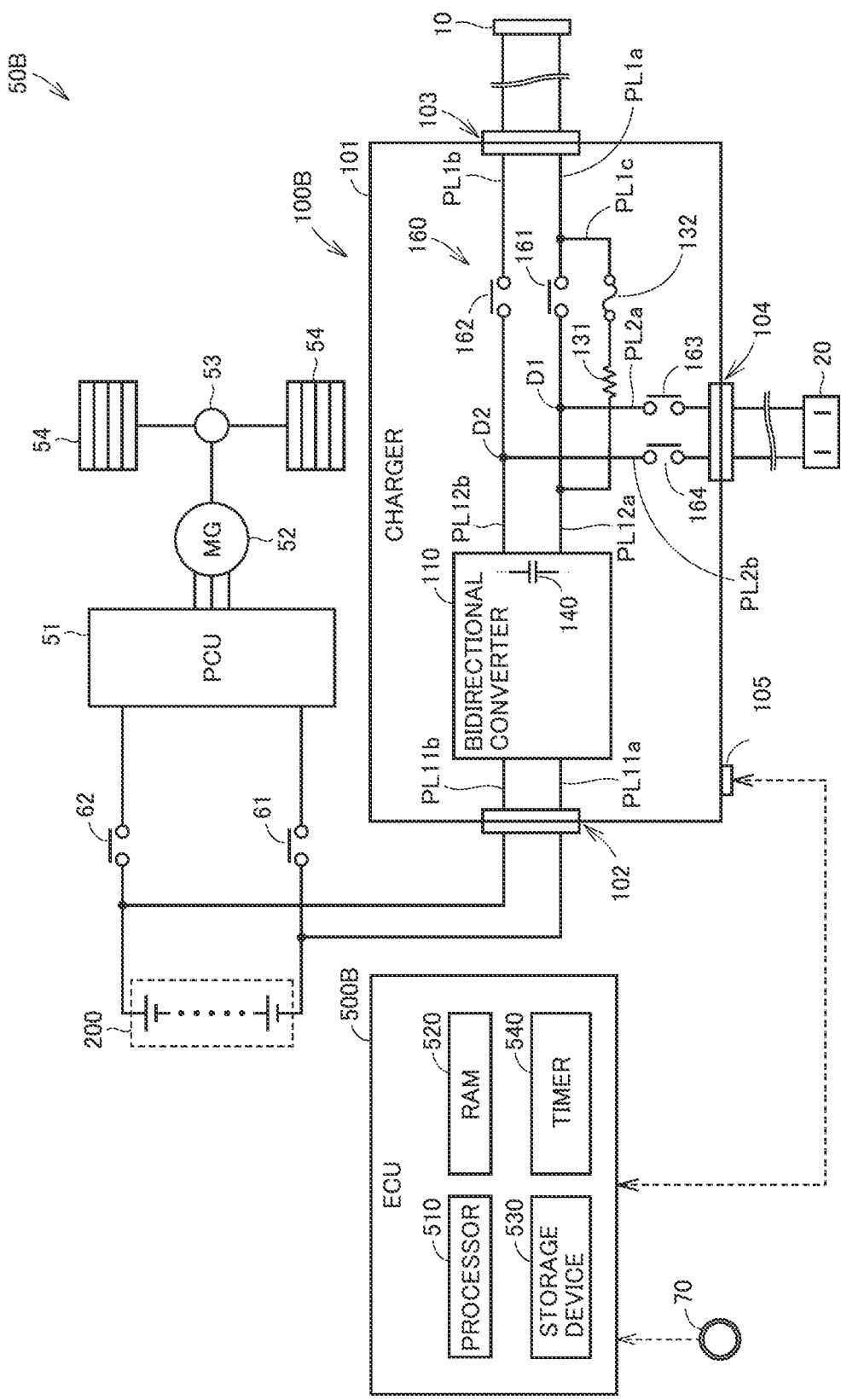
FIG. 10 shows a configuration of a vehicle according to a second embodiment of the present disclosure.

FIG. 10 shows a configuration of vehicle 50B according to the second embodiment. Referring to FIG. 10, vehicle 50B includes an ECU 500B instead of ECU 500A (first embodiment). ECU 500B according to the second embodiment corresponds to an example of "controller" according to the present disclosure. In addition, vehicle 50B includes a charger 100B instead of charger 100A (first embodiment). Charger 100B includes, in housing 101, bidirectional converter 110 (including capacitor 140), a switching device 160, limiting resistance 131, and fuse 132.

Power line PL11a having the first polarity and power line PL11b having the second polarity are connected to the first end of bidirectional converter 110. Power line PL12a having the first polarity and power line PL12b having the second polarity are connected to the second end of bidirectional converter 110. Power line PL12a branches off into power line PL1a and power line PL2a at a branch point D1. Power line PL12b branches off into power line PL1b and power line PL2b at a branch point D2.

Switching device 160 includes NO (Normally-Open) contact relays 161 to 164. Each of NO contact relays 161 to 164 is implemented by an electromagnetic mechanical relay. Switching device 160 is configured such that each of NO contact relays 161 to 164 switches between connection and disconnection of each of the first power path, the second power path and the third power path. Each of NO contact relays 161 to 164 according to the second embodiment corresponds to an example of "switching relay" according to the present disclosure.

NO contact relays 161 and 162 form a pair to switch between connection and disconnection of the first power path. NO contact relays 161 and 162 are arranged on power lines PL1a and PL1b, respectively. When NO contact relays 161 and 162 are both in a connected state, the first power path is in a connected state. When at least one of NO contact relays 161 and 162 enters a disconnected state, the first power path enters a disconnected state. NO contact relays 161 and 162 according to the second embodiment correspond to examples of "first switching relay" and "third switching relay", respectively.

NO contact relays 163 and 164 form a pair to switch between connection and disconnection of the second power path. NO contact relays 163 and 164 are arranged on power lines PL2a and PL2b, respectively. When NO contact relays 163 and 164 are both in a connected state, the second power path is in a connected state. When at least one of NO contact relays 163 and 164 enters a disconnected state, the second power path enters a disconnected state. NO contact relays 163 and 164 according to the second embodiment correspond to examples of "second switching relay" and "fourth switching relay", respectively.

NO contact relay 161 is arranged between first AC port 103 and branch point D1 to switch between connection and disconnection of the first power path. NO contact relay 162 is arranged between first AC port 103 and branch point D2 to switch between connection and disconnection of the first power path. NO contact relay 163 is arranged between second AC port 104 and branch point D1 to switch between connection and disconnection of the second power path. NO contact relay 164 is arranged between second AC port 104 and branch point D2 to switch between connection and disconnection of the second power path. NO contact relay 161 is connected in parallel to limiting resistance 131. NO contact relay 161 functions as a precharge relay.

Figure 11:
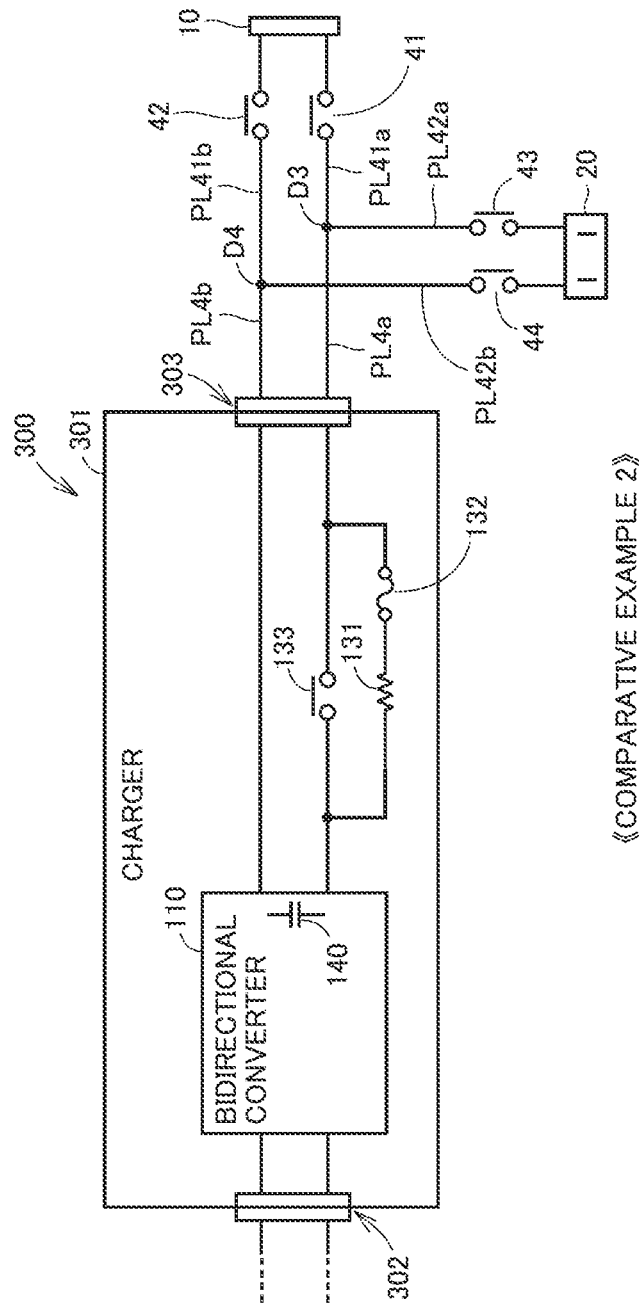
FIG. 11 shows a manner of use of a charger according to Comparative Example 2.

Hereinafter, an effect produced by charger 100B according to the second embodiment will be described, in comparison with charger 300 according to the comparative example. FIG. 11 shows a manner of use of charger 300 according to Comparative Example 2. Charger 300 shown in FIG. 11 is the same as charger 300 shown in FIG. 6. Hereinafter, a manner of use of charger 300 according to Comparative Example 2 will be described, with attention focused mainly on differences from a manner of use of charger 100B shown in FIG. 10.

Referring to FIG. 11, a power line PL4a having the first polarity and a power line PL4b having the second polarity are connected to AC port 303 of charger 300. Power line PL4a branches off into a power line PL41a and a power line PL42a at a branch point D3. NO contact relays 41 and 43 are provided on power lines PL41a and PL42a, respectively. Power line PL4b branches off into a power line PL41b and a power line PL42b at a branch point D4. NO contact relays 42 and 44 are provided on power lines PL41b and PL42b, respectively.

In Comparative Example 2, the switching device (NO contact relays 41 to 44) that switches between connection and disconnection of each of the first power path and the second power path is provided outside housing 301. In charger 300, the number of relays around charger 300 is likely to increase and circuits around charger 300 is likely to become complicated. When the circuits around charger 300 become complicated, the burden of the wiring work is likely to increase and the frequency of occurrence of an abnormality is likely to increase. In addition to the switching device (NO contact relays 41 to 44) provided outside housing 301, precharge relay 133 is provided inside housing 301.

In contrast, in charger 100B according to the second embodiment, as shown in FIG. 10, switching device 160 (NO contact relays 161 to 164) provided inside housing 101 can bring one of the first power path and the second power path into the connected state and bring the other into the disconnected state. Thus, the number of relays provided around charger 100B (i.e., outside charger 100B) can be reduced. Furthermore, in charger 100B, NO contact relay 161 is connected in parallel to limiting resistance 131. Since NO contact relay 161 also functions as a precharge relay, the number of relays provided inside charger 100B can also be reduced.

Figure 12:
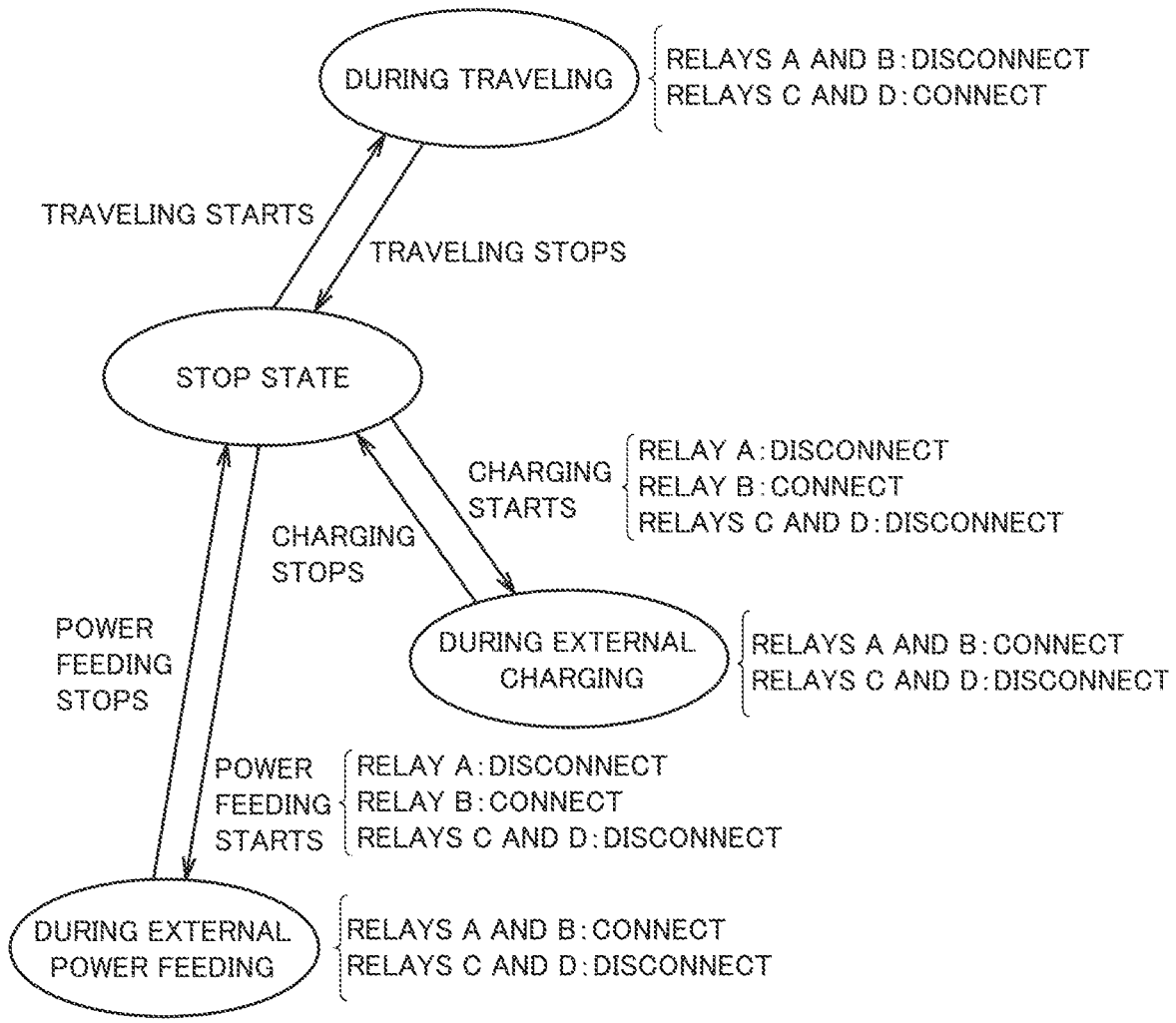
FIG. 12 shows a manner of control of switching relays for each state of the vehicle according to the second embodiment of the present disclosure.
Figure 13:
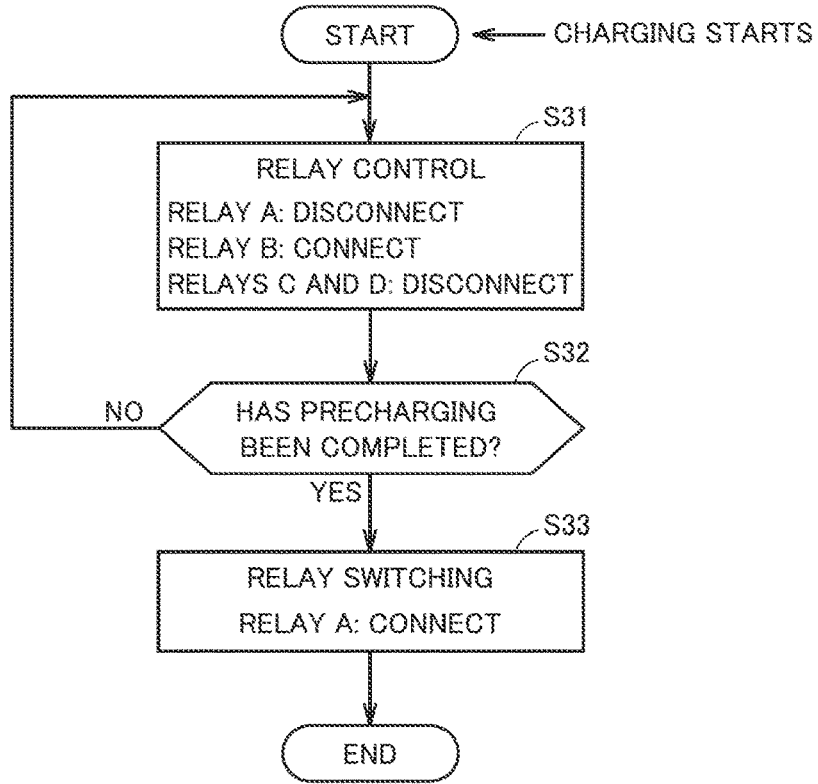
FIG. 13 is a flowchart showing relay control performed by a controller at the start of external charging in the second embodiment of the present disclosure.
Figure 14:
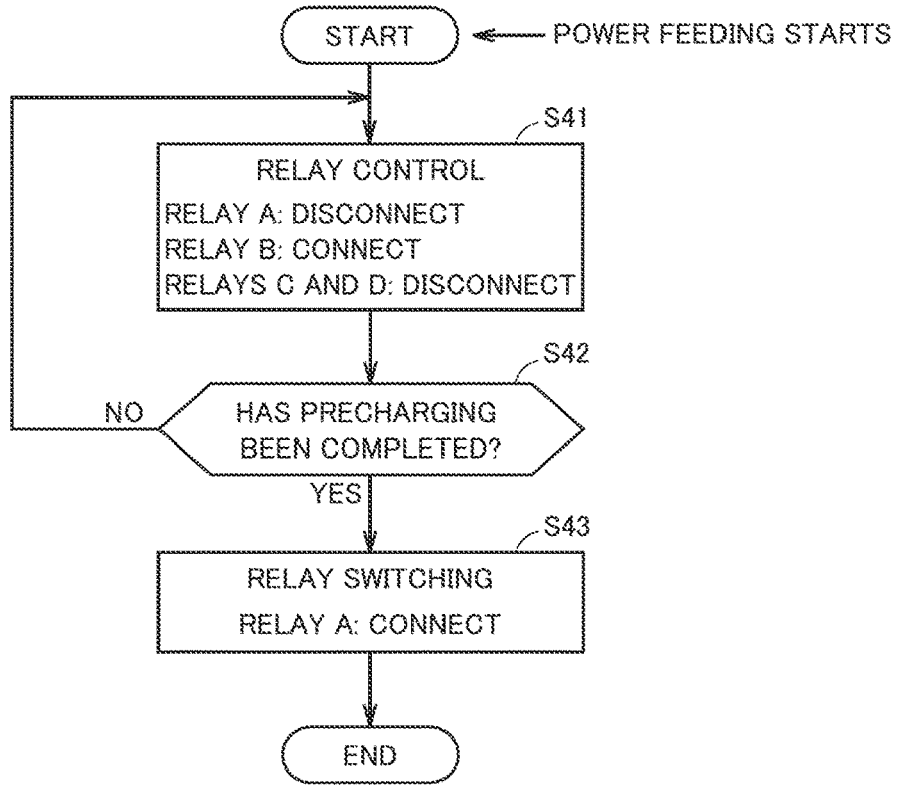
FIG. 14 is a flowchart showing relay control performed by the controller at the start of external power feeding in the second embodiment of the present disclosure.

FIG. 12 shows a manner of control of the switching relays (NO contact relays 161 to 164) for each state of vehicle 50B. In FIG. 12 and FIGS. 13 and 14 described below, "relay A" refers to NO contact relay 161, "relay B" refers to NO contact relay 162, "relay C" refers to NO contact relay 163, and "relay D" refers to NO contact relay 164.

Referring to FIG. 12, when vehicle 50B is in "during traveling", ECU 500B brings NO contact relays 161 and 162 into the disconnected state and brings NO contact relays 163 and 164 into the connected state. As a result, the first power path enters the disconnected state, and the second power path enters the connected state. As described above, since the second power path is in the connected state during traveling of vehicle 50B, electric power can be supplied from battery 200 to electric outlet 20. When vehicle 50B is in "during traveling", ECU 500B controls bidirectional converter 110 such that the second AC power is output to electric outlet 20. Therefore, an occupant can use electric outlet 20 (vehicle interior electric outlet) during traveling of vehicle 50B.

When external charging is started, ECU 500B according to the second embodiment performs a process shown in FIG. 13 described below, instead of the process shown in FIG. 8, thereby controlling NO contact relays 161 to 164 (switching relays).

FIG. 13 is a flowchart showing relay control performed by ECU 500B at the start of external charging. The process shown in this flowchart is performed when external charging is started.

Referring to FIG. 13 together with FIG. 10, in S31, ECU 500B brings NO contact relay 162 into the connected state and bring NO contact relays 161, 163 and 164 into the disconnected state. With such relay control, only the third power path, of the first to the third power path, enters the connected state. Thus, the inrush current is suppressed by limiting resistance 131 and precharging of capacitor 140 is performed.

In S32, ECU 500B determines whether or not the precharging has been completed. When a voltage of capacitor 140 reaches a predetermined reference value, ECU 500B may determine that the precharging has been completed.

When the precharging is in execution (NO in S32), S31 and S32 are repeated, and thus, NO contact relay 162 is maintained in the connected state and NO contact relays 161, 163 and 164 are maintained in the disconnected state. Then, when the precharging has been completed (YES in S32), ECU 500B switches NO contact relay 161 to the connected state in S33. As a result, NO contact relays 161 and 162 both enter the connected state, and the first power path enters the connected state. When the processing in S33 is performed, a series of process shown in FIG. 13 ends. Thereafter, external charging is performed, with NO contact relays 161 and 162 both in a closed state (connected state).

As described above, in vehicle 50B, ECU 500B controls switching device 160 such that when external charging is started, NO contact relay 161 connected in parallel to limiting resistance 131 brings the first power path into the disconnected state and thus limiting resistance 131 suppresses the inrush current at the time of precharging (S31), and when the precharging is completed (YES in S32), NO contact relay 161 brings the first power path into the connected state (S33). With such control, the inrush current at the start of external charging (at the time of precharging) can be suppressed.

When external power feeding (i.e., power feeding for outputting the third AC power from first AC port 103 to inlet 10) is started, ECU 500B performs a process shown in FIG. 14 described below, thereby controlling NO contact relays 161 to 164 (switching relays).

FIG. 14 is a flowchart showing relay control performed by ECU 500B at the start of external power feeding. The process shown in this flowchart is performed when external power feeding is started.

Referring to FIG. 14 together with FIG. 10, the processing similar to that in S31 to S33 in FIG. 13 is performed in S41 to S43, respectively. After the processing in S43, external power feeding is performed, with NO contact relays 161 and 162 both in the closed state.

As described above, in vehicle 50B, ECU 500B controls switching device 160 such that when external power feeding is started, NO contact relay 161 connected in parallel to limiting resistance 131 brings the first power path into the disconnected state and thus limiting resistance 131 suppresses the inrush current at the time of precharging (S41), and when the precharging is completed (YES in S42), NO contact relay 161 brings the first power path into the connected state (S43). With such control, the inrush current at the start of external power feeding (at the time of precharging) can be suppressed.

Other Embodiments

In each of the above-described embodiments, electric outlet power feeding is not performed when the vehicle is not in "during traveling". However, the present disclosure is not limited thereto, and electric outlet power feeding may be performed when the vehicle is not in "during traveling". For example, in the second embodiment, all of NO contact relays 161 and 164 may enter the connected state when vehicle 50B is in "during external charging". As a result, the first AC power input to first AC port 103 is supplied to both bidirectional converter 110 and second AC port 104. Electric outlet 20 may include a built-in power conversion circuit that performs predetermined power conversion (e.g., voltage transformation) of the second AC power output from second AC port 104. For example, when the first AC power has a voltage of 200 V, the second AC power also has a voltage of 200 V. In such a case, the power conversion circuit built into electric outlet 20 may step down the second AC power, such that AC power having a voltage of 100 V is output from electric outlet 20.

The configuration of the vehicle is not limited to the configurations shown in FIGS. 1 and 10. Although each of FIGS. 1 and 10 shows the configuration in which only one MG is provided, the number of MGs is not limited thereto, and a plurality of (e.g., two) MGs may be provided. The vehicle is not limited to an electric vehicle (EV) and may be, for example, a plug-in hybrid vehicle (PHV).

In order to suppress deterioration of bidirectional converter 110, application of a voltage of battery 200 to bidirectional converter 110 may be prevented when the vehicle is in "stop state". For example, in the configuration shown in FIG. 1 or FIG. 10, SMRs 61 and 62 may be provided at a position closer to battery 200 such that SMRs 61 and 62 are located between battery 200 and the charger. The ECU (controller) may bring SMRs 61 and 62 into the disconnected state when the vehicle is in "stop state", and bring SMRs 61 and 62 into the connected state when the vehicle is in any of "during traveling", "during external charging" and "during external power feeding". Alternatively, in the configuration shown in FIG. 1 or FIG. 10, relays may be added onto power lines PL11a and PL11b in housing 101. The ECU (controller) may bring the added relays into the disconnected state when the vehicle is in "stop state", and bring the added relays into the connected state when the vehicle is in any of "during traveling", "during external charging" and "during external power feeding".

The number of switching relays provided in the housing of the charger can be changed as appropriate. For example, in the configuration shown in FIG. 10, NO contact relay 162 may be omitted. In some embodiments, the capacitor is not precharged in the bidirectional converter. The capacitor to be precharged may be provided at a position apart from the bidirectional converter. The capacitor to be precharged may be provided outside the housing of the charger.

In each of the above-described embodiments, description has been given of the example in which each of first AC port 103 and second AC port 104 is a connector. However, in some embodiments, each of first AC port 103 and second AC port 104 may not be a connector.

Figure 15:
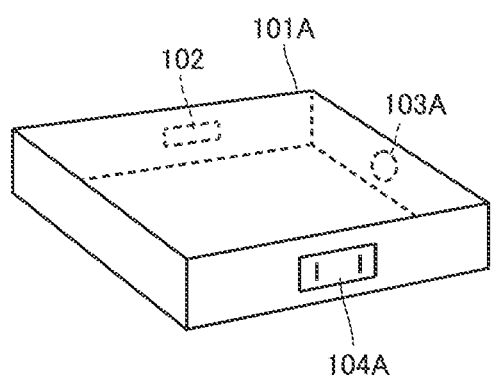
FIG. 15 shows a modification of a first AC port and a second AC port shown in FIG. 2.

FIG. 15 shows a modification of first AC port 103 and second AC port 104 shown in FIG. 2. Referring to FIG. 15, in the present modification, a first AC port 103A and a second AC port 104A are provided in a side surface of a housing 101A. First AC port 103A corresponds to an inlet. A charging plug is connectable to the inlet. Second AC port 104A corresponds to an electric outlet. An electric outlet plug is connectable to the electric outlet. In the configuration shown in FIG. 15, a plug can be connected to housing 101A. A charger including such housing 101A may be applied to a small-sized mobile body, or may be applied to a unit other than the mobile body. The shape of housing 101A and the arrangement of each port are not limited to the example shown in FIG. 15, and can be changed as appropriate.

The power storage device to which the charger is applied may be a power storage device mounted on a transportation device other than a vehicle (such as a ship or an airplane), or may be a power storage device mounted on an unmanned mobile body (such as an automated guided vehicle (AGV), an agricultural machine, a mobile robot, or a drone), or may be a power storage device mounted on a mobile device (such as a smartphone or a wearable device), or may be a power storage device placed in a building (such as a house or a factory).

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A charger comprising:
    a bidirectional converter;
    a DC port that electrically connects the charger to a power storage device;
    a first AC port that receives first AC power for charging the power storage device; and
    a second AC port that outputs second AC power, wherein the bidirectional converter
        converts the first AC power into DC power and outputs the DC power to the DC port, and
        converts DC power supplied from the power storage device to the DC port into the second AC power and outputs the second AC power to the second AC port, the charger further comprising:
a switching device including at least one switching relay that selectively switches between a first power path and a second power path, the first power path connecting the bidirectional converter and the first AC port, the second power path connecting the bidirectional converter and the second AC port; and
an electric resistance connected in parallel to a position that bypasses a switching relay on the first power path, of the at least one switching relay,
wherein the bidirectional converter is connected to each of a first power line and a second power line,
wherein the first power line is connected to the DC port, and
wherein the second power line branches off into the first power path and the second power path at a branch point.

2. The charger according to claim 1, wherein
the switching relay on the first power path is a CO contact relay arranged at the branch point to bring one of the first power path and the second power path into a connected state and bring the other into a disconnected state.

3. The charger according to claim 1, wherein
the switching relay on the first power path is a first switching relay arranged between the first AC port and the branch point to switch between connection and disconnection of the first power path, and
the at least one switching relay in the switching device further includes a second switching relay arranged between the second AC port and the branch point to switch between connection and disconnection of the second power path.

4. A vehicle comprising:
the charger according to claim 1; and
a controller that controls the charger, wherein
the controller controls the switching device such that
when charging of the power storage device using the first AC power is started, the switching relay on the first power path brings the first power path into a disconnected state and thus the electric resistance suppresses an inrush current at the time of precharging, and
when the precharging is completed, the switching relay on the first power path brings the first power path into a connected state.

5. The vehicle according to claim 4, further comprising:
the power storage device electrically connected to the DC port of the charger;
an inlet electrically connected to the first AC port of the charger; and
a vehicle interior electric outlet electrically connected to the second AC port of the charger.

6. The vehicle according to claim 5, wherein
a component that operates in accordance with a control signal from the controller is not provided between the first AC port and the inlet and between the second AC port and the vehicle interior electric outlet.

7. The vehicle according to claim 5, wherein
at least during traveling of the vehicle, the controller brings the first power path into the disconnected state and brings the second power path into the connected state.

8. The vehicle according to claim 5, wherein
the first AC port outputs third AC power,
the bidirectional converter converts the DC power supplied from the power storage device to the DC port into the third AC power and outputs the third AC power to the first AC port, and
the controller controls the switching device such that when external power feeding for outputting the third AC power from the first AC port to the inlet is started, the switching relay connected in parallel to the electric resistance brings the first power path into the disconnected state and thus the electric resistance suppresses an inrush current, and then, the switching relay connected in parallel to the electric resistance brings the first power path into the connected state.

9. A charger comprising:
a bidirectional converter;
a DC port that electrically connects the charger to a power storage device;
a first AC port that receives first AC power for charging the power storage device; and
a second AC port that outputs second AC power, wherein
the bidirectional converter
converts the first AC power into DC power and outputs the DC power to the DC port, and
converts DC power supplied from the power storage device to the DC port into the second AC power and outputs the second AC power to the second AC port,
the charger further comprising:
a switching device including at least one switching relay that selectively switches between a first power path and a second power path, the first power path connecting the bidirectional converter and the first AC port, the second power path connecting the bidirectional converter and the second AC port; and
an electric resistance connected in parallel to a position that bypasses a switching relay on the first power path, of the at least one switching relay,
wherein the DC port is a connector that connects, to the charger, a power line extending to the power storage device,
wherein the first AC port is a connector that connects, to the charger, a power line extending to an inlet to which a charging plug is connectable, and
wherein the second AC port is a connector that connects, to the charger, a power line extending to an electric outlet that outputs AC power.

10. A vehicle comprising:
the charger according to claim 9; and
a controller that controls the charger, wherein
the controller controls the switching device such that
when charging of the power storage device using the first AC power is started, the switching relay on the first power path brings the first power path into a disconnected state and thus the electric resistance suppresses an inrush current at the time of precharging, and
when the precharging is completed, the switching relay on the first power path brings the first power path into a connected state.

11. The vehicle according to claim 10, further comprising:
the power storage device electrically connected to the DC port of the charger;
an inlet electrically connected to the first AC port of the charger; and
a vehicle interior electric outlet electrically connected to the second AC port of the charger.

12. The vehicle according to claim 11, wherein
a component that operates in accordance with a control signal from the controller is not provided between the first AC port and the inlet and between the second AC port and the vehicle interior electric outlet.

13. The vehicle according to claim 11, wherein
at least during traveling of the vehicle, the controller brings the first power path into the disconnected state and brings the second power path into the connected state.

14. The vehicle according to claim 11, wherein
the first AC port outputs third AC power,
the bidirectional converter converts the DC power supplied from the power storage device to the DC port into the third AC power and outputs the third AC power to the first AC port, and
the controller controls the switching device such that when external power feeding for outputting the third AC power from the first AC port to the inlet is started, the switching relay connected in parallel to the electric resistance brings the first power path into the disconnected state and thus the electric resistance suppresses an inrush current, and then, the switching relay connected in parallel to the electric resistance brings the first power path into the connected state.

15. A charger comprising:
a bidirectional converter;
a DC port that electrically connects the charger to a power storage device;
a first AC port that receives first AC power for charging the power storage device; and
a second AC port that outputs second AC power, wherein
the bidirectional converter
converts the first AC power into DC power and outputs the DC power to the DC port, and
converts DC power supplied from the power storage device to the DC port into the second AC power and outputs the second AC power to the second AC port,
the charger further comprising:
a switching device including at least one switching relay that selectively switches between a first power path and a second power path, the first power path connecting the bidirectional converter and the first AC port, the second power path connecting the bidirectional converter and the second AC port;
an electric resistance connected in parallel to a position that bypasses a switching relay on the first power path, of the at least one switching relay; and
a capacitor precharged by the first AC power at a start of charging of the power storage device.

16. A vehicle comprising:
the charger according to claim 15; and
a controller that controls the charger, wherein
the controller controls the switching device such that
when charging of the power storage device using the first AC power is started, the switching relay on the first power path brings the first power path into a disconnected state and thus the electric resistance suppresses an inrush current at the time of precharging, and
when the precharging is completed, the switching relay on the first power path brings the first power path into a connected state.

17. The vehicle according to claim 16, further comprising:
the power storage device electrically connected to the DC port of the charger;
an inlet electrically connected to the first AC port of the charger; and
a vehicle interior electric outlet electrically connected to the second AC port of the charger.

18. The vehicle according to claim 17, wherein
a component that operates in accordance with a control signal from the controller is not provided between the first AC port and the inlet and between the second AC port and the vehicle interior electric outlet.

19. The vehicle according to claim 17, wherein
at least during traveling of the vehicle, the controller brings the first power path into the disconnected state and brings the second power path into the connected state.

20. The vehicle according to claim 17, wherein
the first AC port outputs third AC power,
the bidirectional converter converts the DC power supplied from the power storage device to the DC port into the third AC power and outputs the third AC power to the first AC port, and
the controller controls the switching device such that when external power feeding for outputting the third AC power from the first AC port to the inlet is started, the switching relay connected in parallel to the electric resistance brings the first power path into the disconnected state and thus the electric resistance suppresses an inrush current, and then, the switching relay connected in parallel to the electric resistance brings the first power path into the connected state.

* * * * *